United States Patent Office 3,499,018
Patented Mar. 3, 1970

3,499,018
ETHYLENE BIS DITHIOCARBAMATE COMPLEXES CONTAINING FOUR DIFFERENT METALS
Arthur Stevenson, West Bromwich, England, assignor to Robinson Brothers Limited, Birmingham, England, a British company
No Drawing. Filed July 5, 1967, Ser. No. 651,115
Int. Cl. C07g 15/00; C07c 155/08; A01n 9/12
U.S. Cl. 260—429                8 Claims

ABSTRACT OF THE DISCLOSURE

New chemical products have been prepared which are coreacted mixed-metals ethylene bis dithiocarbamates in which the mixed metals include manganese, zinc and copper, and preferably also iron. Products of the invention have valuable fungicidial and miticidal properties and may be formulated into fungicidial and miticidal compositions. The products containing iron are of particular value in the treatment of citrus fruit while it is growing.

BACKGROUND OF THE INVENTION

The invention relates to new chemical products, to processes for their preparation, to compositions containing them and to agricultural methods in which they are applied as fungicides or miticides, or both.

It is well known that various dithiocarbamates, and copper compounds, have fungicidal properties. Zinc ethylene bis dithiocarbamate, known as zineb, and the corresponding manganese salt, known as maneb, and Bordeaux mixture, copper oxychloride and cuprous oxide are well known as fungicides and are widely used. A disadvantage that all these materials do tend to suffer from is that, although they have satisfactory fungicidal properties, on many crops they often exert undesirable phytotoxicity or, in the case of maneb and zineb, short persistancy. It would be desirable if a fungicide could be produced having greater fungicidal properties, or less phytotoxic action, or greater persistancy, and preferably all three features, than zineb, maneb and the above coppe compounds.

Citrus fruit are subject to a number of defects, some of which only become apparent on storage of the grown fruit. It would be desirable if a composition was available that successfully counteracted these growth defects and which was substantially not phytotoxic.

One growth defect of citrus fruit is the occurrence of citrus russet mite. The mite becomes apparent during the growth of the fruit and causes physical damage to the fruit. During growth a physiological defect known as russet may become apparent on the fruit, and this seems to follow on from an attack of citrus russet mite. Other physiological defects that may become apparent on fruit during growth include windscar and pitting. The causes of windscar and pitting are not certain but there are grounds for thinking that they may be of fungal origin and possibly russet is also of fungal origin. Other defects of citrus fruit are certainly of fungal origin and include especially three that become apparent on fruit during storage. One of these is melanose, caused by *Diaporthe citri* (Fawcett), another is penicillium mould and another is stem end rot, caused by Diplodia and Phomopsis.

It has been proposed to apply various sprays to citrus trees, generally after blooming, but so far no spray has been developed that combats satisfactorily all of these growth defects and that does not give rise to serious phytotoxicity. For example, maneb is effective against russet mite but often exerts quite serious phytotoxicity, resulting in brown blotches, or tear stain, on the fruit.

SUMMARY OF THE INVENTION

It is an object of the invention to provide new chemical products having improved fungicidal properties and persistency, or reduced phytotoxicity, when used as fungicides, or two or all three of these properties. It is a further object of the invention to provide products that serve both as fungicides and miticides, and especially as fungicides and miticides against the fungi and mites that attack citrus fruit.

New chemical products according to the invention are water insoluble coreacted mixed-metals ethylene bisdithiocarbamates in which the mixed-metals include maganese, zinc and copper, the products containing at least 5% by weight, based on the total weight of metal, of each of manganese, copper and zinc.

We call these new products "coreacted" since they are formed in a single chemical reaction as distinct from forming single metal salts of ethylene bis dithiocarbamic acid and combining these. The products are made by a method which comprises adding a first aqueous solution of a mixture of water soluble salts of the mixed metals to a second aqueous solution of one or more water soluble ethylene bis dithiocarbamates.

DETAILED DESCRIPTION OF THE INVENTION INCLUDING PREFERRED EMBODIMENTS

The products according to the invention are not simple mixtures of monomeric salts. They may contain some monomeric salts but they contain also polymers and mixed polymers of the salts. Thus the product contains polymers each including one or more of the salt-forming metal ions. The divalent ethylene bis dithiocarbamate ion and each of the metal ions present in the product can combine in chain or lattice form in the formation of the polymeric products. The amount of individual monomers of each of the salts may be very low, and in fact the monomers may only be present in trace amounts. As evidence of this infrared absorption spectra were determined on zineb, on maneb, on a two metal coreacted product containing 15.4% manganese and 6.05% copper, and on a three metal product containing 8.15% zinc, 5.45% copper and 7.95% manganese, all percentages being by weight based on the total dry weight of the mixtures. The important features of the spectra obtained on each of these four materials are set out in Table 1. From this it will be noted that certain peaks characteristic of the individual zinc or manganese salts are absent from the spectrum of the three metal product which itself exhibits other peaks and bands which appear to be specific to itself. Similar differences are also apparent in comparison with the spectra given by the two metal composition.

TABLE 1

| Wavelength, microns | Zineb | Maneb | Manganese and copper coppt. | Zinc manganese and copper coppt. |
|---|---|---|---|---|
| 6.2 | VW | M | | }MS |
| 6.3 | | | | |
| 6.5 | VS | }S | {S | S |
| 6.6 | | | | |
| 6.9 | M | | | |
| 7.65 | | M | | |
| 8.35 | | | M | M |
| 8.75 | }W | {S | M | W |
| 8.9 | | | VW | VW |
| 9.55 | S | | | |
| 10.1 | | VW | MW | M |
| 10.25 | }VS | { | | |
| 10.35 | | | | |
| 10.4 | | S | | S |
| 10.5 | | | S | |
| 11.2 | | | {VW | |
| 11.5 | | }VW | { | M |
| 11.7 | | { | | |
| 12.7 | | }W | { | |
| 12.8 | | | | |
| 12.9 | S | | | |
| 13.6 | | | | W |
| 14.0 | M | | | |

In this table: VS denotes Very Strong Absorption; S denotes Strong Absorption; MS denotes Medium Strong Absorption; M denotes Medium Absorption; MW denotes Medium Weak Absorption; W denotes Weak Absorption; VW denotes Very Weak Absorption.

Absorption bands where they exist are enclosed by brackets.

The three metal product subjected to infrared analysis did in fact contain a small amount of iron which had been introduced as an impurity in the zinc, manganese and copper salts.

When preparing our new product the temperature at which the precipitation is conducted has some effect on the properties of the product obtained since it appears to have an effect on the particle size, and, in general, the smaller the particle size the greater will be the fungicidal efficiency, per unit weight of product, since the product then covers a greater area. The temperature is preferably between 10 and 50° C., with best results being obtained between 10 and 30° C.

The pH of the reaction medium is preferably kept between 3 and 9, since below pH 3 the starting dithiocarbamates are unstable and above 9 the product obtained tends to be unstable. For example manganese hydroxide may be precipitated and this gives rise to instability.

The reaction may be conducted batchwise or continuously, for example the reactants being brought together in a continuously synthesis unit such as a pipe line mixer. The reaction however is not instantaneous and in a continuous process it is necessary to permit some residence time, of the order of 5 to 10 minutes, for reaction to occur.

The amount of liquor in the reaction medium appears to have an effect on the properties of the product, apparently affecting the polymeric state of the product. Preferably the amount is such that the reaction product, which is in the form of a slurry, has a solids content of from 20 to 40% by weight, 30 to 40% by weight being preferred. The concentratic of the reactants should therefore be selected appropriately.

The precipitate may be separated by filtration or centrifuging from the mother liquid, and dried. Although the drying may be conducted in any convenient manner, in air or vacuum, it is preferred to keep the drying temperature at or below 80° C. Satisfactory drying at temperatures of or below 80° C. can be obtained by tray or rotary vacuum drying, by spray drying or by vacuum film drying.

As indicated the mixed-metals of the new products may include manganese, zinc and copper in an amount of at least 5% of each by weight based on the total weight of metal. They also include iron, which may be included with the manganese as an impurity, the amount then being perhaps about 0.1% by weight or less iron based on the total weight of metal, but the most desirable products according to the invention are those which contain at least 0.5% by weight iron, based on the total weight of metal.

The amount of each of the metals in the coreacted products according to the invention is selected by appropriate selection of the amount of those metals in the aqueous solution added to the ethylene bis dithiocarbamate aqueous solution.

Preferred products according to the invention contain from 10 to 60% manganese, preferably 25 to 50%, and often most desirably 30 to 45% manganese, based on the total weight of metals. The preferred products contain from 10 to 60%, preferably 25 to 50% and often most desirably 30 to 45% of zinc, based on the total weight of metals. The amount of copper is often less than the amount of zinc and the amount of manganese, and preferably is from 10 to 40%, based on the total weight of metals. Most preferably it is from 15 to 35% with best results generally being obtainet when the amount is between 15 and 25%, based on the total weight of metals.

Although these ranges have been given they are merely illustrative of those giving optimum results and satisfactory results can be obtained with quantities of the three named metals outside the preferred ranges given, provided that the metals are each present in an amount of at least 5% by weight of the total weight of metals.

The amount of iron present in the mixture is generally less than the amount of copper. While useful improvement in the properties of the products are noticeable with values of iron over 0.5%, by weight based on the total weight of metals, the greatest improvement is obtained when the amount of iron is between 1 and 20% by weight, with best results being obtained when the amount is between 1 and 10%, and preferably between 2 and 5%.

Products according to the invention are effective against a wide variety of fungi, such as the fungi that cause potato blight and tomato blight. They are effective against fungi that attacks, for example, hops cucumbers and celery and beans, and corn such as wheat, maize and rye, and rice. In general best results are obtained in all cases when the products contain iron.

Products which contain more than 0.5% iron, based on the total weight of metal, are particularly effective as fungicides and are of particular value in the treatment of fungal diseases of citrus fruit. They are also of particular value in controlling mite on the citrus fruit. The relationship between the amounts of iron and copper seem to have some effect on the effectiveness of the products according to the invention for the treatment of citrus fruit and the molar proportions of iron:copper should preferably be from 1:1 to 1:15. Best results seem to be obtained when the molar proportion is from 1:3 to 1:10. These ratios also seem to be preferable when the products are used to combat fungi on a wide range of other crops.

Very good results have also been obtained, especially with the product described in Example 3 below as Cufram Z, in the control of the fungal disease known as shot-hole fungus, on almonds.

Cufram Z has fungicidal activity for this purpose as good as or better than the fungicide generally used for this purpose (Captan 50W) and has the advantage that it leaves no toxic residues, unlike the fungicide used for the purpose at present.

When used for controlling fungi and/or mites on citrus fruit the products according to the invention should be applied to the citrus fruit trees, generally early in the growth period of the fruit, usually just after blooming. They may be applied also later in the season, for example a few weeks before picking. The effectiveness of the compounds according to the invention becomes apparent while the fruit is growing, in respect of both fungicidal and miticidal activity, and on storage of the grown fruit.

in respect of additional fungicidal activity of the compounds. The low phytotoxicity of the products is apparent both during growth and on storage of the grown fruit. An additional advantage of the products according to the invention when used on citrus fruit is that they yield a particularly dark green luxuriant growth. All dithiocarbamates are prone to improve the quality of the growth on the trees but the products according to the invention provide a greater improvement than is obtainable with other dithiocarbamate fungicides.

The use of the four metal products according to the invention on citrus fruit provides for the first time a single product treatment programme that protects the growing fruit both against fungi and against mites. Previously programmes using two or more products have been essential to combat both fungi and mites. The products also exert lower phytotoxicity than any of the products used commercially on citrus fruit.

The products according to the invention may be compounded into fungicidal or miticidal compositions by admixture with any suitable fungicidal carrier. Thus for example they may be mixed with a liquid vehicle, for example water or oil, together with an appropriate surface active agent, to form a suspension, that may be in concentrated form or in dilute form suitable for direct application to a crop. Also, the precipitate formed during the preparation of the product need never be separated from the mother liquor, but after suitable dilution may be applied direct to a crop. The dried mixture may be mixed with a solid diluent, for example talc, to form a dusting powder.

The products will be applied to citrus trees or other vegetation being protected against fungi or mites in fungicidally or miticidally effective amounts. These amounts can readily be found by experiment. As an example liquid compositions according to the invention may contain from 0.1 to 10 pounds, and usually 1 to 2 pounds and preferably about 1.5 pounds, of dried product per 100 gallons of liquid and the amount of the diluted product applied to crops such as vines, hops, and tomatoes and potatoes may be 20 to 250 gallons per acre. The amount applied to citrus trees may be from 1 to as much as 500 gallons per tree. When the products are applied in dry form, for example as dusting powders, the compositions usually applied may contain from 5 to 25% of the product.

The following are some examples of the invention.

EXAMPLE 1

A coreacted product according to the invention was obtained by adding 18.1 of an aqueous mixed solution 1.22 kg. manganese sulphate monohydrate, 1.79 kg. zinc sulphate heptahydrate, and 1.07 kg. copper sulphate pentahydrate, to 16.6 l. of an aqueous solution containing 275 gm./litre of ammonium ethylene bis dithiocarbamate. The addition took place over 30 minutes at a temperature within the temperature range of 20 to 30° C., and vigorous agitation was maintained throughout the addition. At the end of the addition the slurry-like mass then existing was filtered under suction to collect the precipitate which was washed with 4 litres of water at a temperature between 30 and 40° C. and then allowed to drain on the filter. The filter cake was then transferred to trays and dried at 80° C. under a vacuum of 20 mm. mercury and finally dressed by hammer-milling.

The sulphates used in this process were ordinary commercially impure sulphates containing ferrous and ferric iron as impurities with the result that the product obtained, labelled product A, contained not only zinc, manganese and copper but also iron in an amount of about 0.1% based on dry weight of precipitate. The content of the other metals, by weight based on the dry weight of the precipitate was 8.15% zinc, 5.45% copper and 7.95% manganese.

By a process similar to that described, three coprecipitates based on varying quantities of zinc and copper, and three based on manganese and copper, all probably with a small amount of impurity iron, were prepared. One of these other precipitates, product B, contained 15.4% manganese and 6.05% copper, based on the dry weight of the precipitate, and contained also a small amount of impurity iron. The five other coprecipitates prepared contained 9.1% Mn and 10.0% Cu, 19.54% Mn and 1.0% Cu, 13.54% Zn and 10.0% Cu, 17.7% Zn and 5.8% Cu, and 22.7% Zn and 1.0% Cu.

A number of field trials were conducted to compare the properties of these various mixtures.

Trial 1

Each of the precipitates was made up as a suspension of 1.5 lbs. of dried product per hundred gallons of water containing sodium lignin sulphonate and sodium dioctyl sulphosuccinate as surface active agent. The compositions so obtained were applied to potatoes. Product A was observed visually to give by far the best blight control and final crop yield. The six two metal compositions gave blight control and crop yield no better than that obtained in other tests carried out using conventional fungicides such as zineb and maneb.

Trial 2

More detailed tests were carried out to compare product A, product B, maneb, zineb, maneb mixed with copper oxychloride, copper oxychloride, and triphenyl tin acetate. Except for product A and product B these are all conventional fungicides. A four randomised block layout was used, with eight plots of potatoes per block, and each plot consisting of 2 x 9-ft. rows (45 sq. ft.). All sprays were applied by hand syringe at ½-gal. per plot (160 gal. per acre). The results obtained are set out in Table II.

TABLE II

| Treatment | Dosage, lbs./per acre | Average incidence of blight, percent (4 plots) after (weeks)-of | | | | Weight of healthy ware treatment means, lbs./plot [1] |
|---|---|---|---|---|---|---|
| | | 2 | 4 | 6 | 8 | |
| Copper oxychloride | 5 | 0.1 | 0.1 | 34.2 | 73.7 | 31.1 |
| Maneb/copper oxychloride | 3 | 0.1 | 0.1 | 28.0 | 75.0 | 33.4 |
| Maneb | 1½ | 0.1 | 0.1 | 28.0 | 68.7 | 31.6 |
| Zineb | 2 | 0.1 | 0.1 | 34.2 | 67.5 | 33.4 |
| Product B | 1½ | 0.1 | 0.1 | 34.2 | 73.7 | 30.7 |
| Product A | 1½ | 0.1 | 0.1 | 23.0 | 56.2 | 35.5 |
| Triphenyl tin acetate | 1½ | 0.1 | 0.1 | 46.7 | 73.7 | 33.1 |
| Control | 1 | 0.1 | 0.1 | 50.0 | 93.2 | 28.6 |

[1] No treatment.

Unfortunately in this trial blight struck late in the season but if it had occurred earlier a much more marked difference in the effectiveness of product A as opposed to that of all the other fungicides tested would probably have been apparent. However, despite this, it is to be noted that product A gives by far the best results.

Trial 3

An important advantage of the coprecipitated mixtures according to the invention is that they are less phytotoxic than many of the fungicides available at present and also than two metal mixtures, such as, for example, product B. Four sets of test plots of potatoes were observed. One was sprayed throughout the season with product A, one with product B, and one with four sprays of maneb and one finishing spray of copper oxychloride. The fourth plot was untreated. The defoliations obtained and the yields of potatoes obtained are shown in Table III.

TABLE III

| Treatment | Percent defoliation after (weeks)— | | | | | | | Healthy ware, lbs./plct |
|---|---|---|---|---|---|---|---|---|
| | 2 | 4 | 5 | 6 | 8 | 9 | 10 | 11 | |
| Product A | 0 | 0 | 0.5 | 3 | 7 | 11 | 28 | 55 | 29.6 |
| Product B | 0 | 0 | 0.5 | 3 | 7 | 14 | 30 | 63 | 27.8 |
| Control (untreated) | 0 | 0 | 0.5 | 3 | 7 | 17 | 37 | 73 | 27.0 |
| Maneb/copper chloride | 0 | 0 | 0.5 | 3 | 7 | 17 | 47 | 85 | |

EXAMPLE 2

The coprecipitation process described in Example 1 was repeated except that the metal sulphates added were substantially free of iron with the result that the coprecipitated mixture was substantially free of iron. This product was labelled product C.

The process was repeated again using manganese, zinc and copper sulphates that were substantially free of iron but including in the mixed sulphate solution 248 g. of ferrous sulphate heptahydrate. The coprecipitated mixture, labelled product D, contained 1% iron, by weight based on the total dry weight of the mixture.

Laboratory spore-drop tests were carried out against four common species of culture with products C and D to determine $LD_{50}$, which is the concentration required to inhibit germentation of 50% of the spores. The results are shown in Table IV.

TABLE IV

| | $LD_{50}$ in p.p.m. | | | |
|---|---|---|---|---|
| | Venturi | Botrytis | Fusarium | Cercospora |
| Product C | No germinaton at 100 p.p.m. | 100–1,000 | >1,000 | <10 |
| Product D | No germination at 10 p.p.m. | 100–1,000 | 100–1,000 | 10–100 |

Laboratory spore tests are not wholly reliable, but it is apparent from the results shown in this table that the presence of iron, in product D, results in a general improvement in fungicidal activity.

EXAMPLE 3

The coprecipitation process described in Example 1 was repeated using a solution containing 2.07 kg. zinc sulphate heptahydrate, 1.1 kg. manganese sulphate monohydrate, 1.09 kg. copper sulphate pentahydrate and 138.5 grams ferrous sulphate heptahydrate, all dissolved in 18 litres water. The product obtained contained, based on the total weight of the product 7.1% manganese, 9.33% zinc, 5.53% copper and 0.56% iron, this corresponding to amounts, based on the total weight of metals, of about 38% zinc, 35% manganese, 23% copper and 2.5% iron. This product, that we labelled Cufram Z, was tested for its effectiveness as a fungicide and a miticide on citrus trees. The tests were conducted by spraying sample crops of grapefruit trees grown in Florida, U.S.A., with a suspension of 1.0 pound Cufram Z in 100 gallons water first at the end of April and then at the beginning of August. On the same dates other similar plots of grapefruit trees were sprayed with materials which include "ferbam," which is ferric dimethyl dithiocarbamate, and "polyram," which is an oxidation product of sodium ethylene bis dithiocarbamate. The effectiveness of the various materials used, at the concentrations used, as miticides against russet mite are shown in Table 5. An indication of the phytotoxicity of the various materials used is also shown in this table by the value given under "tear stain," tear stain being the brown marking on fruit that can result from the use of a phytotoxic compound on citrus trees. The observations shown in Table 5 were made at the beginning of August, following the spray applied at the end of April.

TABLE V

| Materials/100 gal.[1] | Tear stain | Percent trees infected Russet mites | Density of Russet mite on affected trees |
|---|---|---|---|
| Cufram Z | 1.0 lb., none | 80 | Light. |
| Maneb | 1.0 lb., slight | 80 | Do. |
| Triphenyl tin hydroxide | 1.0 lb., moderate | 80 | Moderate. |
| Polyram | 1.0 lb., slight | 90 | Light to moderate. |
| Triphenyl tin hydroxide | 0.5 lb., slight | 90 | Do. |
| Zineb | 1.0 lb., slight | 100 | Dense. |
| Ferbam 1.0 lb.+triphenyl tin hydroxide | 0.25 lb., light to moderate. | 100 | Moderate. |
| Ferbam | 1.0 lb., moderate to intense. | 100 | Dense. |

After picking, fruit was stored for two or three months and random samples of fruit of trees from the various test plots were studies in the middle of the following January. Table 6 shows the amount of fruits suffering from russet, Table 7 shows the amount of suffering from pitting, Table 8 shows the amount suffering from windscar, Table 9 shows the amount suffering from melanose and Table 10 show the amount suffering from penicillium mould and stem end rot.

TABLE VI

| Material | Per 100 gal. lb. | Percent fruits russeted |
|---|---|---|
| Cufram Z | 1.0 | 45 |
| Ferbam 1.0 lb.+triphenyl tin hydroxide | 0.25 | 48 |
| Maneb | 1.0 | 50 |
| Zineb | 1.0 | 51 |

TABLE VII

| Material | Per 100 gal. lb. | Percent fruits affected by pitting |
|---|---|---|
| Cufram Z | 1.0 | 4 |
| Triphenyl tin hydroxide | 1.0 | 5 |
| Maneb | 1.0 | 7 |
| Triphenyl tin hydroxide | 0.5 | 9 |
| Polyram | 1.0 | 9 |
| Ferbam 1.0 lb.+triphenyl tin hydroxide | 0.25 | 14 |

TABLE VIII

| Material | Per 100 gal. lb. | Percent fruits blemished by "windscar" |
|---|---|---|
| Cufram Z | 1.0 | 25 |
| Triphenyl tin hydroxide | 1.0 | 70 |

TABLE IX

| Material | Per 100 gal. lb. | Percent fruits affected by Melanose |
|---|---|---|
| Cufram Z | 1.0 | 25 |
| Maneb | 1.0 | 27 |
| Zineb | 1.0 | 27 |
| Polyram | 1.0 | 31 |
| Ferbam 1.0 lb.+triphenyl tin hydroxide | 0.25 | 33 |
| Triphenyl tin hydroxide | .5 | 36 |
| Ferbam | 1.0 | 52 |

TABLE X

| Material | Per 100 gal. lb. | Percent of fruits affected | |
|---|---|---|---|
| | | Penicillium | Stem end rot |
| Cufram Z | 1.0 | 2 | 6 |
| Ferbam | 1.0 | 0 | 6 |
| Zineb | 1.0 | 2 | 7 |
| Polyram | 1.0 | 2 | 7 |
| Maneb | 1.0 | 2 | 8 |
| Triphenyl tin hydroxide | 1.0 | 4 | 10 |
| Ferbam 1.0 lb.+triphenyl tin hydroxide | 0.25 | 0 | 12 |
| Triphenyl tin hydroxide | 0.5 | 4 | 14 |

All these tests were carried out on the crop grown during 1966, a year in which there was particularly serious fungal and mite attack on citrus in Florida.

From the results quoted above it is apparent that Cufram Z is less phytotoxic than any of the other materials used and is as effective as a miticide as maneb and is better than all the other miticides tested. In the results in all the other tables Cufram Z is shown to give results that are as good as or better than all the other materials tested with the single exception that ferbam gave better protection against penicillium. Ferbam, however, gave very poor protection against, for example melanose and in any event is highly phytotoxic. Cufram Z gives the best all round results and with the lowest phytotoxicity.

All the tests quoted in this example are on grapefruit. However the superiority of the product according to the invention on other citrus fruit has been established in other field trials. For example the product gives better control of stylar end rot on limes than the copper oxychloride usually used and also seems to increase the fruit size.

I claim:

1. A product which is a water insoluble coreacted manganese-zinc-copper-iron ethylene bis dithiocarbamate containing from 10 to 60% manganese, 10 to 60% zinc, 10 to 40% copper and 1 to 20% iron, all percentages being by weight based on the total weight of metals.

2. A product which is a water insoluble coreacted manganese-zinc-copper-iron ethylene bis dithiocarbamate containing from 10 to 60% manganese, 10 to 60% zinc, 10 to 40% copper and 1 to 20% iron, all percentages being by weight based on the total weight of metals, and in which the molar proportions of iron:copper is 1:1 to 1:15.

3. A product according to claim 2 in which the said molar proportion of iron:copper is 1:3 to 1:10.

4. A product which is a water insoluble coreacted manganese-zinc-copper-iron ethylene bis dithiocarbamate containing from 25 to 50% zinc, 25 to 50% manganese, 10 to 40% copper and 1 to 10% iron, all percentages being by weight based on the total weight of metal, and in which the molar proportion of iron:copper is 1:3 to 1:10:

5. A product according to claim 4 in which the amount of zinc is from 30 to 45%, the amount of manganese is from 30 to 45%, the amount of copper is from 15 to 35% and the amount of iron is from 2 to 5%, all percentages being by weight based on the total weight of metal.

6. A process for the preparation of a product as defined in claim 1 and comprising adding a first aqueous solution of a mixture of water soluble salts of manganese, copper, zinc and iron to a second aqueous solution of one or more water soluble ethylene bis dithiocarbamates, the product being precipitated from the solution.

7. A process for the production of a product according to claim 2 and which comprises adding a first aqueous solution of a mixture of water soluble salts of manganese, copper, zinc and iron to a second aqueous solution of one or more water soluble ethylene bis dithiocarbamates, the product being precipitated from the solution.

8. A process according to claim 7 in which the concentrations of the first and second aqueous solutions are so selected that the product formed initially on precipitation is a slurry having a solids content of from 20 to 40% by weight.

References Cited

UNITED STATES PATENTS

| | | | |
|---|---|---|---|
| 3,082,229 | 3/1963 | Nash | 260—429 |
| 3,085,042 | 4/1963 | Luginbuhl | 167—22 |
| 3,210,394 | 10/1965 | Nemec et al. | 260—429 |
| 3,259,643 | 7/1966 | Nash | 260—429 |
| 3,379,610 | 4/1968 | Lyon et al. | 167—22 |

FOREIGN PATENTS 1,363,911  5/1964  France.

DELBERT E. GANTZ, Primary Examiner

A. P. DEMERS, Assistant Examiner

U.S. Cl. X.R.

99—154; 424—141, 286, 287, 288, 289, 295